(12) United States Patent
Li et al.

(10) Patent No.: US 11,556,183 B1
(45) Date of Patent: Jan. 17, 2023

(54) TECHNIQUES FOR GENERATING DATA FOR AN INTELLIGENT GESTURE DETECTOR

(71) Applicant: Microsoft Technology Licensing, LLC

(72) Inventors: Ji Li, San Jose, CA (US); Mingxi Cheng, Los Angeles, CA (US); Fatima Zohra Daha, Santa Clara, CA (US); Amit Srivastava, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/490,677

(22) Filed: Sep. 30, 2021

(51) Int. Cl.
*G06F 3/0482* (2013.01)
*G06F 3/01* (2006.01)
(Continued)

(52) U.S. Cl.
CPC ............. *G06F 3/017* (2013.01); *G06N 3/049* (2013.01); *G06V 40/107* (2022.01); *G06V 40/28* (2022.01)

(58) Field of Classification Search
CPC ........ G06F 3/017; G06F 3/011; G06F 3/0485; G06F 3/005; G06F 3/0304; G06F 2203/04806; G06F 3/0346; G06F 3/0486; G06F 3/013; G06F 2203/04104; G06F 2203/04803; G06F 2203/04808;
(Continued)

(56) References Cited

U.S. PATENT DOCUMENTS 10,372,228 B2 *  8/2019  Mao ........................ G06T 7/285
10,410,539 B2     9/2019  Nielson et al.
(Continued)

FOREIGN PATENT DOCUMENTS

CN    110135336 A      8/2019
CN    110727796 A      1/2020
WO    2014127183 A2    8/2014

OTHER PUBLICATIONS

"MediaPipe Hands", Retrieved from: https://web.archive.org/web/20210819101919/https://google.github.io/mediapipe/solutions/hands, Aug. 19, 2021, 15 Pages.
(Continued)

*Primary Examiner* — Rayeez R Chowdhury
(74) *Attorney, Agent, or Firm* — NovoTechIP International PLLC

(57) ABSTRACT

A method and system for generating training data for training a gesture detection machine-learning (ML) model includes receiving a request to generate training data for the gesture detection model, the training data being associated with a target gesture, retrieving data associated with an original gesture, the original gesture being a gesture made using a body part, retrieving skeleton data associated with the target gesture, the skeleton data displaying a skeleton representative of the body part and the skeleton displaying the target gesture, aligning a location of the body part in the data with a location of the skeleton in the skeleton data, providing the aligned data and the skeleton data to an ML model for generating a target data that displays the target gesture, receiving the target data as an output from the ML model, the target data preserving a visual feature of the data and displaying the target gesture, and providing the target data to the gesture detection ML model.

20 Claims, 7 Drawing Sheets

(51) Int. Cl.
*G06N 3/04* (2006.01)
*G06V 40/20* (2022.01)
*G06V 40/10* (2022.01)

(58) Field of Classification Search
CPC .... G06F 3/041; G06F 3/04817; G06F 3/0482; G06F 3/04842; G06F 3/0488; G06F 3/04883; G06F 3/14; G06F 3/1454
See application file for complete search history.

(56) References Cited

U.S. PATENT DOCUMENTS

| | | | | |
|---|---|---|---|---|
| 2013/0010071 | A1* | 1/2013 | Valik | G06F 3/017 345/158 |
| 2014/0125584 | A1* | 5/2014 | Xun | G06F 3/011 345/156 |
| 2016/0358275 | A1 | 12/2016 | Ikawa et al. | |
| 2018/0024641 | A1* | 1/2018 | Mao | A63F 13/428 382/103 |
| 2019/0324553 | A1* | 10/2019 | Liu | H04L 51/02 |
| 2022/0138422 | A1 | 5/2022 | Kulkarni et al. | |

OTHER PUBLICATIONS

Bao, et al., "Depth-Aware Video Frame Interpolation", in Repository of arXiv:1904.00830v1, Apr. 1, 2019, 10 Pages.
"Flesch Reading Ease", Retrieved From: https://simple.wikipedia.org/wiki/Flesch_Reading_Ease, Retrieved Date: Sep. 8, 2020, 2 Pages.
"List of Readability Tests", Retrieved From: https://simple.wikipedia.org/wiki/List_of_readability_tests#Fog_index, Retrieved Date: Sep. 8, 2020, 5 Pages.
"Spache Readability Formula", Retrieved From: https://simple.wikipedia.org/wiki/Spache_Readability_Formula, Retrieved Date: Sep. 8, 2020, 1 Page.
"The Fry Graph Readability Formula", Retrieved From: https://readabilityformulas.com/fry-graph-readability-formula.php. Retrieved Date: Sep. 8, 2020, 3 Pages.
"The New Dale-Chall Readability Formula", Retrieved From: https://readabilityformulas.com/new-dale-chall-readability-formula.php, Retrieved Date: Sep. 8, 2020, 3 Pages.
"Word Sense", Retrieved From: https://en.wikipedia.org/wiki/Word_sense, Retrieved Date: Sep. 8, 2020, 3 Pages.
Kyle, et al., "The Tool for the Automatic Analysis of Lexical Sophistication (TAALES): Version 2.0", in Journal of Behavior Research Methods, vol. 50, Issue 3, Jul. 11, 2017, pp. 1030-1046.
"International Search Report and Written Opinion Issued in PCT Application No. PCT/US21/053054", dated Jan. 17, 2022, 11 Pages.
"Non Final Office Action Issued In U.S. Appl. No. 17/085,975", dated Oct. 5, 2022, 46 Pages.
Shardlow, et al., "Complex: A New Corpus for Lexical Complexity Prediction from Likert Scale Data", In Proceedings of 1st Workshop on Tools and Resources to Empower People with Reading Difficulties, May 11, 2020, pp. 57-62.
Sindhwani, et al., "Method and System for Enhanced Look up of Difficult Words in Text Content", In Journal of IP.com, Feb. 22, 2013, 3 Pages.
"International Search Report & Written Opinion issued in PCT Application No. PCT/US22/038115", dated Nov. 14, 2022, 11 Pages.
Kwolek, Bogdan, "GAN-based Data Augmentation for Visual Finger Spelling Recognition", In Proceedings of SPIE, vol. 11041, Mar. 15, 2019, 8 Pages.

\* cited by examiner

TECHNIQUES FOR GENERATING DATA FOR AN INTELLIGENT GESTURE DETECTOR

BACKGROUND

Many workplaces, schools, universities, and other organizations which may traditionally conduct in-person meetings, classes, and/or presentations have begun conducting remote gatherings. Workplaces may conduct meetings and/or presentations with colleagues and/or clients via remote videoconferencing and/or collaboration platforms. Teachers and professors may conduct classes using similar technologies which allow them to present lectures and/or interact with their students via a virtual classroom setting provided by a remote videoconferencing and/or collaboration platform.

Remote presentation and remote learning, however, often present many challenges. For example, it is common for people in many cultures to use gestures or facial expressions for communicating certain emotions or providing feedback. As such, a presenter or participants in the meeting may need to pay attention to the other participants' gestures to determine if the participants are providing feedback or attempting to communicate a certain message. However, with remote presentation and remote learning, the presenter and/or participants may have a more difficult time paying attention to the audience due to the lack of direct interaction with the participants or due to small screen sizes with many participants being shown in small thumbnails. To address this issue, mechanisms for automatic detection of certain gestures may be employed. However, gesture recognition requires the use of complex and large machine learning (ML) models that have low accuracy and are often run offline.

Hence, there is a need for improved systems and methods of providing intelligent gesture detection in real-time.

SUMMARY

In one general aspect, the instant disclosure describes a data processing system having a processor and a memory in communication with the processor wherein the memory stores executable instructions that, when executed by the processor, cause the data processing system to perform multiple functions. The functions may include receiving a request to generate training data for a gesture detection ML model, the training data being associated with a target gesture, retrieving data associated with an original gesture, the original gesture being a gesture that is made using a body part, retrieving skeleton data associated with the target gesture, the skeleton data displaying a skeleton representative of the body part and the skeleton displaying the target gesture, aligning a first location of the body part in the data with a second location of the skeleton in the skeleton data, providing the aligned data and the skeleton data as input to an ML model for generating a target data that displays the target gesture, receiving the target data as an output from the ML model, the target data preserving a visual feature of the data and displaying the target gesture, and providing the target data to the gesture detection ML model for training the gesture detection ML model in detecting the target gesture.

In yet another general aspect, the instant disclosure describes a method for generating training data for training a gesture detection ML model. The method may include receiving a request to generate training data for the gesture detection ML model, the training data being associated with a target gesture, retrieving data associated with an original gesture, the original gesture being a gesture that is made using a body part, retrieving skeleton data associated with the target gesture, the skeleton data displaying a skeleton representative of the body part and the skeleton displaying the target gesture, aligning a first location of the body part in the data with a second location of the skeleton in the skeleton data, providing the aligned data and the skeleton data as input to an ML model for generating a target data that displays the target gesture, receiving the target data as an output from the ML model, the target data preserving a visual feature of the data and displaying the target gesture, and providing the target data to the gesture detection ML model for training the gesture detection ML model in detecting the target gesture.

In a further general aspect, the instant disclosure describes a non-transitory computer readable medium on which are stored instructions that when executed cause a programmable device to perform functions of receiving a request to generate training data for a gesture detection ML model, the training data being associated with a target gesture, retrieving data associated with an original gesture, the original gesture being a gesture that is made using a body part, retrieving skeleton data associated with the target gesture, the skeleton data displaying a skeleton representative of the body part and the skeleton displaying the target gesture, aligning a first location of the body part in the data with a second location of the skeleton in the skeleton data, providing the aligned data and the skeleton data as input to an ML model for generating a target data that displays the target gesture, receiving the target data as an output from the ML model, the target data preserving a visual feature of the data and displaying the target gesture, and providing the target data to the gesture detection ML model for training the gesture detection ML model in detecting the target gesture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
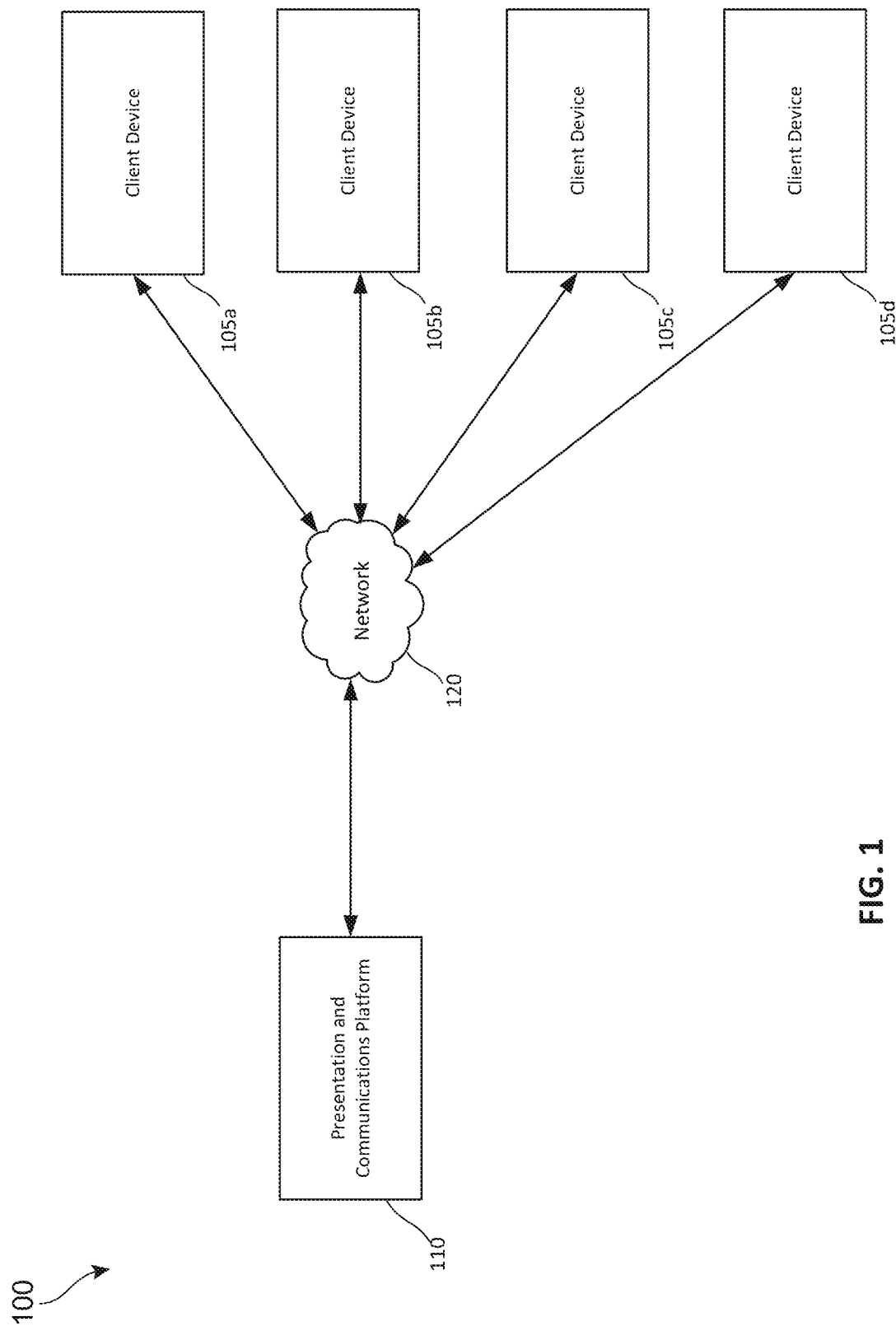
FIG. 1 depicts an example computing environment upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In today's environment, many users are utilizing videoconferencing and/or other collaboration platforms to conduct live meetings and gatherings remotely. While remote gatherings offer some conveniences, they often present many challenges. One of the challenges of remote meetings is the ability of the presenter and/or participants to notice other participants' gestures. This is particularly true for large gatherings where not all participants are shown on one screen or the image of each participant is too small to be able to notice individual gestures.

Speakers in many cultures and language use gestures when they speak or wish to communicate a message to another person. As a result, some ML models have been developed that aim to automatically detect an individual's gesture from an image or video file. However, to provide accurate gesture detection, these models require extensive training. Furthermore, the models are often large in size and as such cannot be deployed to users' client devices. As a result, currently used ML models for gesture detection are often run offline and are not fast enough to be able to provide real-time gesture detection during a live meeting. Thus, there exists a technical problem of inability of current gesture detection models to efficiently and quickly detect gestures during a live communication session.

The output of gesture detection models may be used to provide various functions such as displaying icons representative of an individual's gesture on the screen (e.g., displaying emoticons during a meeting), interpreting signlanguage, facilitating human-computer interactions and the like. As a result, it is important for the signals used in each of these fields to receive an accurate detection of a gesture. Accordingly, gesture detection often requires a high level of accuracy. However, currently used models exhibit high false recognition rates for gestures that are not included in the training data. For example, a model trained for recognizing hand raise and thumbs up gestures may get confused by a quote sign gesture or a peace sign gesture, if they are not included in the training data. Getting sufficient amounts of data for many different types of gestures, however, is difficult, as the process of data preparation, labeling, verification, and legal review is time consuming and expensive. Thus, there exits another technical problem of high error rates by current gesture detection models because of expensive and time-consuming training data generation.

To address these technical problems and more, in an example, this description provides a technical solution used for automatically generating target training data for use in training a gesture detection model. To do so, techniques may be used to utilize existing training data such as an existing original class of gestures (e.g., video streams showing a known gesture such as a single finger raise) to generate a target class of gestures (e.g., video streams showing a peace sign). This may be achieved by utilizing skeleton images that display the target gesture, preprocessing the existing original video streams and the skeleton images, and then utilizing an ML model to combine an original image extracted from the original video stream with the target skeleton image to create the target training image. The target image may preserve the visual features of the original image but display the target gesture. The ML model used may be a generative adversarial network (GAN) model. The target image may then be used as training data for training a gesture detection model in detecting gestures for which training data is difficult and/or expensive to obtain. As a result, the technical solution provides an improved method of generating training data for gesture detection models. The improved method is targeted to areas that require improvement, is less costly and results in much improved results without requiring the use of large models or large training datasets.

As will be understood by persons of skill in the art upon reading this disclosure, benefits and advantages provided by such implementations can include, but are not limited to, a technical solution to the technical problems of inefficient, inadequate, and/or inaccurate training of gesture detection models. Technical solutions and implementations provided herein optimize the process of training gesture detection models, thus resulting in gesture detection models that are smaller in size, provide more accurate results and can be run in real-time. The benefits provided by these technology-based solutions yield more user-friendly applications, improved communications and increased system and user efficiency.

The following terminology is used in the description. A "meeting," "online meeting," "presentation" or "online presentation" may be used herein to refer to a live communication session during which two or more people communication with each other via audio/video signals. A "presenter" as used herein refers to a user of a client device that is sharing an online presentation content with at least one participant. The presenter may be participant of an online communications session with other participants and may assume the role of presenter for at least a portion of the online communications session. A "participant" as used herein refers to a user who is part of the audience of the online presentation being shared by the presenter. An online presentation may include multiple participants, and the participants may be located remotely from the presenter.

FIG. 1 depicts an example computing environment upon which aspects of this disclosure may be implemented. The computing environment 100 may include a presentation and communications platform 110. The example computing environment 100 may also include a plurality of client devices, such as client devices 105*a*, 105*b*, 105*c*, and 105*d*. The client devices 105*a*, 105*b*, 105*c*, and 105*d* and the presentation and communications platform 110 may communicate via the network 120. The network 120 may be a wired or wireless network or a combination of wired and wireless networks that connect one or more elements of the system 100. Additional details of the presentation and communications platform 110 and client devices 105*a*, 105*b*, 105*c*, and 105*d* are discussed in greater detail with respect to FIG. 2.

The presentation and communications platform 110 may be implemented as a cloud-based service or set of services. The presentation and communications platform 110 may be configured to schedule and host online presentations, virtual meetings, video conferences, online collaboration sessions, and/or other online communications sessions in which at least a portion of the participants are located remotely from the presenter. The presentation and communications platform 110 may be used by companies, schools, universities, and other organizations which may traditionally conduct in-person meetings, classes, and/or presentations but must adapt to rapidly changing requirements in which many are working or attending school remotely. The presentation and communications platform 110 may provide services that enable the presenter to present content to remote participants and/or to facilitate a meeting that includes the remote participants. The presentation and communications platform 110 may also facilitate the collecting of feedback and response information from the participants of a presentation or communication session that may help the presenter to improve the content presented and/or the presenter's presentation techniques.

The presentation and communications platform 110 may receive live feedback during an online presentation from users who are using the client devices 105b, 105c, and 105d to participate in the online presentation. As will be discussed in the examples that follow, the feedback may be implicit reactions derived from user gestures. For example, the presentation and communications platform 110 may be configured to recognize participant gestures and actions in audio and/or video streams captured by the client devices 105b, 105c, and 105d of the participants and sent to the presentation and communications platform 110.

The presentation and communications platform 110 may be implemented by a presentation platform, such as Microsoft PowerPoint Live, which enables a presenter to present a presentation online and to invite users to view the presentation on their own devices. The presentation and communications platform 110 may also be implemented by a communications platform, such as Microsoft Teams, which provides an online hub for team collaboration including chat and video conferencing. A presenter may utilize such a communications platform to conduct a meeting, a lecture, conference, or other such event online in which participants may be able to communicate with the presenter as well as other participants via chat, audio and/or video conferencing. In such an online communications platform, a participant may serve as a presenter for part of an online communications session, while another participant may serve as a presenter for another part of the online communications session.

The client devices 105a, 105b, 105c, and 105d are computing devices that may be implemented as portable electronic devices, such as mobile phones, tablet computers, laptop computers, portable digital assistant devices, portable game consoles, and/or other such devices. The client devices 105a-105d may also be implemented in computing devices having other form factors, such as a vehicle onboard computing system, a video game console, a desktop computer, and/or other types of computing devices. Each of the client devices 105a-105d may have different capabilities based on the hardware and/or software configuration of the respective client device. The internal hardware structure of a client device is discussed in greater detail with respect to FIGS. 6 and 7. While the example implementation illustrated in FIG. 1 includes four client devices, other implementations may include a different number of client devices.

Figure 2:
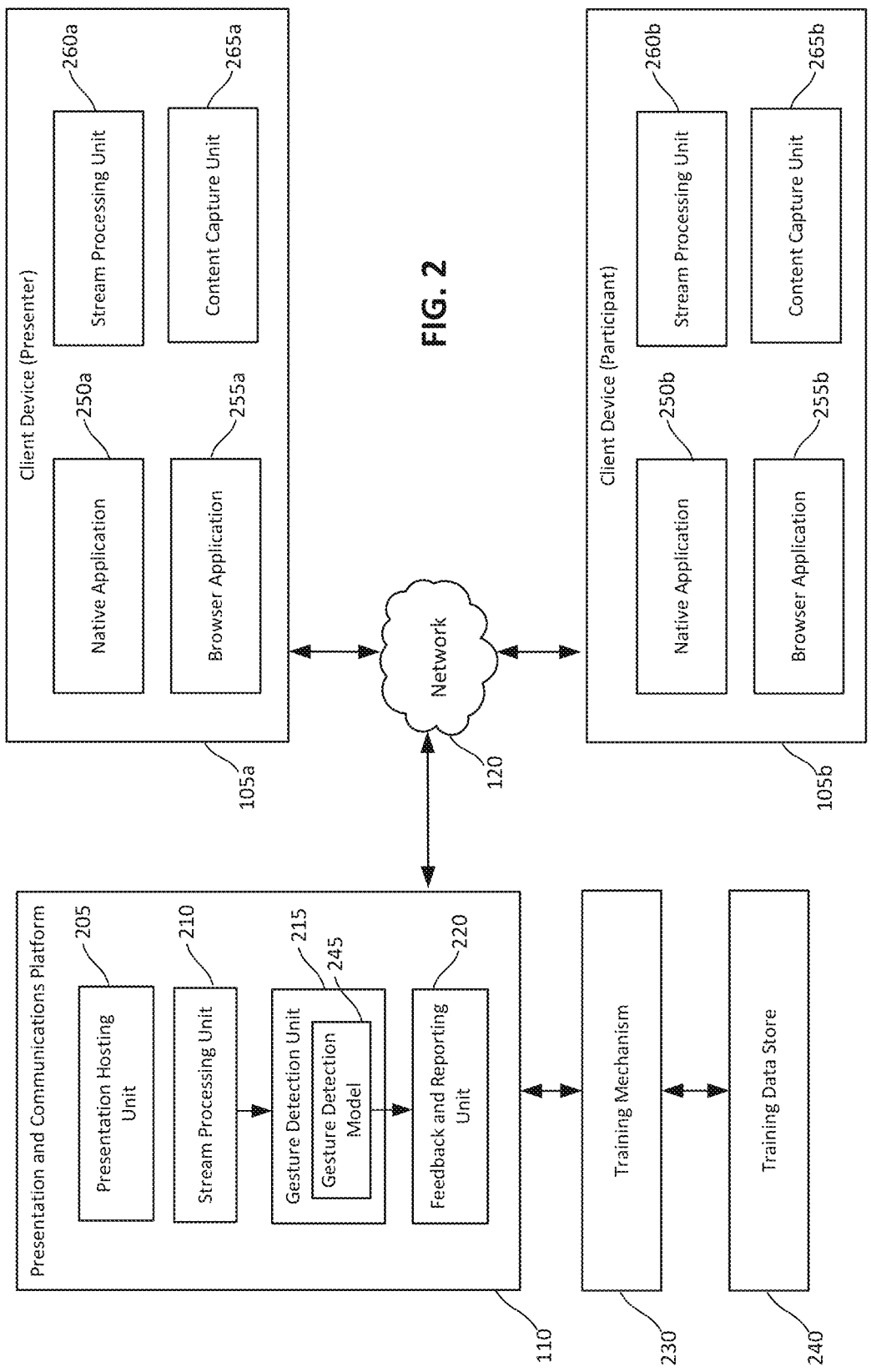
FIG. 2 is a diagram showing additional details and elements of the computing environment shown in FIG. 1.

FIG. 2 is a diagram showing additional details and elements of the computing environment shown in FIG. 1. The presentation and communications platform 110 may include multiple elements that perform various functions. In an example, presentation and communications platform 110 includes the presentation hosting unit 205, a stream processing unit 210, a gesture detection unit 215 and a feedback and reporting unit 220.

The presentation hosting unit 205 may be configured to facilitate hosting of an online presentation by a presenter. Furthermore, the presentation hosting unit 205 may be configured to permit the presenter to share presentation content (e.g., presentation slides) with a plurality of participants. The presentation hosting unit 205 may allow the presenter to engage with the audience by enabling the audience to provide feedback to the presenter. The feedback may be provided explicitly or implicitly. Explicit feedback may include use of an input/output device such as a keyboard to send reaction icons or emoticons. Emoticons include graphic symbols that represent an idea, an emotion or a concept. Emoticons are used in a variety of messaging applications to convey a message without use of words. As such, emoticons may serve as a shortcut for conveying an idea in graphic form. To enable the participants to quickly convey a feedback message to the presenter, the presentation hosting unit 205 may enable the participants of an online presentation to send emoticons to the presenter during the online presentation in real time. A participant may expressly generate reactions to the presentation by clicking on or otherwise activating a reaction icon or emoticon representing the participant's reaction to the presentation. The presentation hosting unit 205 may provide the presenter with configuration settings in which the presenter may control whether the feedback is visible only to the presenter or is visible to all the participants of the online presentation.

In addition to enabling the participants to provide explicit feedback, the presentation hosting unit 205 may provide mechanisms for capturing implicit feedback. That is because clicking on or otherwise activating a reaction icon is not a natural way for humans to provide feedback. Instead, humans often provide feedback by utilizing gestures or facial expressions. To capture and detect such natural feedback, the presentation and communications platform 110 provides a stream processing unit 210 for processing the media streams received from the client devices 105 and to provide the processed media streams to the gesture detection unit 215 to analyze the contents of the media streams and automatically detect participant gestures that may convey feedback information. In this manner, the participants may be able to engage with the presenter by providing more natural reactions, such as a thumbs up or thumbs down gesture, smiling, laughing, shaking their head, nodding, yawning, and/or other actions.

The stream processing unit 210 may use one or more ML models to analyze the media stream content received from the client devices 105 and to provide high-level feature information that may be used by one or more downstream components such as the gesture detection unit 215 to provide various features to the presenter and/or the participants of the online presentation. In some implementations, stream processing unit 210 implements an architecture for efficiently analyzing audio, video, and/or multimodal media streams and/or presentation content for various other elements of the presentation and communications platform 110. A technical benefit of this architecture is the media streams and/or presentation content may be analyzed to extract feature information for processing by various models, and the high-level feature information may then be utilized by the gesture detection unit 215 and the feedback and reporting unit 220. This approach provides a more efficient use of memory and processing resources on the data processing system hosting the presentation and communications platform 110 by eliminating the need to analyze content separately for the gesture detection unit 215 and the feedback and reporting unit 220. Alternatively, each of the various elements of the presentation and communications platform 110 may employ their own stream processing mechanisms.

The gesture detection unit 215 may be configured to analyze the processed media streams received from the stream processing unit 210 to automatically identify participant gesture information and/or to generate feedback that may be used to help the presenter improve their presentation skills. To achieve this, the gesture detection unit 215 may employ one or more ML models such as the gesture detection model 245 for detecting gestures and/or specific expressions.

As a general matter, the methods and systems described herein may include, or otherwise make use of, a machine-trained model to identify gestures or expressions from video or image data. Machine learning (ML) generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in data and/or determine associations between various images and gestures. Such determination may be made following the accumulation, review, and/or analysis of data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate detection of gestures and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The ML model trainer may be pretrained ML model. The generation of ML models may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

In some implementations, each class of gestures and/or expressions utilizes a different ML model. For example, one model may be used for detecting thumbs up gestures, while another model is used for detecting a handwave. In some implementations, the ML models used include convolutional neural networks (CNNs) to capture both spatial and temporal information from video frames. In an example, the ML models used are three dimensional CNNs (3DCNN). To ensure that the gesture detection unit 215 can process the media streams quickly and efficiently and can provide feedback in real-time, a light weight 3DCNN may be used. The input of the ML model 245 may include a sequence of red, green and blue (RGB) frames captured via a participant's client device (e.g., by utilizing the client device's camera feed) and processed via the stream processing unit 210. In some implementations, the ML model 245 includes three phases: video preprocessing, feature learning and classification.

Video preprocessing may include converting the input video into RGB frame sequences. In an example, this involves using four successive frames as input and resizing each frame. The resizing may be performed using the following formula:

$$(w,h) = ((\text{width} \times 100) \div \text{height}, 100) \qquad (1)$$

In formula 1, w represents width, and h represents height. The input size may be variable to accommodate the processing of videos with different aspect ratios (e.g., mobile devices, desktops, etc.). The RGB channels of each frame may also be normalized. The resizing and normalization can help reduce the computational cost and training convergence of the model. In some implementations, the gesture detection model includes six 3D convolution layers and two fully connected layers followed by an adaptive average pooling layer to handle frames of different input sizes. The features extracted using these layers may then be fed into a softmax layer for classification. The softmax layer may output the probability for each class of gestures. In an example, to avoid overfitting and enhance the model generalization on test data, a dropout layer is applied after the fully connected layer. The output of the gesture detection model 245 may include an identification of a detected gesture (e.g., single finger raise, hand raise, thumps up, etc.) or an identification of no gesture. The detected gestures may belong to a list of labeled gestures for detection of which the gesture detection model 245 has been trained.

In some implementations, the ML model(s) used may be stored locally on the client devices 105b, 105c, and 105d. For example, the ML model(s) may operate with or be stored as part of the native applications 250. One or more ML models used by the gesture detection unit 215 may be trained by a training mechanism 230. The training mechanism 230 may use training datasets stored in the training data store 240 to provide initial and ongoing training for each of the models. Alternatively or additionally, the training mechanism 230 may use training datasets unrelated to the data store 240. This may include training data such as knowledge from public repositories (e.g., Internet), knowledge from other enterprise sources, or knowledge from other pretrained mechanisms (e.g., pretrained models). In one implementation, the training mechanism 230 uses labeled training data from the data store 240 to train one or more of the ML models via deep neural network(s) or other types of ML algorithms. The initial training may be performed in an offline stage or may be performed online. Additionally and/or alternatively, the one or more ML models may be trained using batch learning.

In some implementations, training the ML models includes a variety of preprocessing steps. Preprocessing may include duplicating the data by applying horizontal flipping to gestures that require one hand only. This step ensures that the training set is inclusive of both left and right hands. Furthermore, to ensure the diversity of the training dataset, lighting augmentation techniques, small translation and/or rotation may be applied to the available training images and/or videos. Moreover, to account for people who are far away from the camera, padding may be applied to some training data.

Training neural networks that perform gesture detection with a high degree of accuracy may require a significant amount of data. Furthermore, to reduce inaccurate detection of gestures, training data may need to be provided for a large number of human gestures and expressions. For example, to correctly identify hand gestures that are similar to each other, a large number of training video data for each gesture may be needed. In an example, to correctly distinguish between a single finger raise, peace signal and hand wave, video streams showing each of those hand gestures may need to be used in training the models. However, it may be very time consuming and expensive to obtain and label such video streams for many types of gestures. As a result, as discussed in more detail herein with respect to FIG. 3, the technical solution disclosed herein makes use of the training data available in the training data store 240 to generate training data for the class of gestures for which few or no training data is available.

The feedback and reporting unit 220 may be configured to receive gesture detection information generated by the gesture detection unit 215 and/or reaction information provided by the participants and to generate feedback and/or one or more summary reports that provide participant reaction information and recommendations for how the presenter may improve their presentation skills and/or presentation content. The feedback may include live feedback generated based on gestures detected during the meeting. In some implementations, the feedback may be provided while the presenter is presenting and may include icons or emoticons that correspond with the detected gestures. For example, a thumbs up gesture may result in the display of a thumps emoticon on the presenter's user interface (UI) screen. Alternatively, a textual message may be displayed that indicates one participant has provided a thumbs up gesture. In an example, the name of the participant providing the gesture may be displayed along with the message and/or emoticon.

In some implementations, the reaction icons or emotions may be rendered over the presentation content being shared by the presenter by the client device 105a of the presenter and/or by the client device 105b of the participants if the presenter has chosen to share the reactions with participants. In addition to implicit feedback, the feedback and reporting unit 220 may also process and display explicit feedback received from participants. For example, the participants may enter emoticons in an input box of their user interface and the inputted emoticons may be processed by the feedback and reporting unit 225 and displayed on the UI screen of the presenter.

The reporting aspect of the feedback and reporting unit 225 may be triggered automatically at the end of an online presentation to provide one or more summary reports to the presenter. The summary reports may include a reactions' section that includes a list of reactions received during the presentation. The list of reactions may include a section for explicit reactions and another section for implicit reactions. Each section may list a number and/or type of reaction/gesture received from the participants during the presentation.

The presentation hosting unit 205 may permit the presenter to schedule the online presentation or communication session in which the online presentation is to be presented. In the example shown in FIG. 2, the client device 105a is being used by the presenter to control an online presentation or to facilitate an online communications session, and the client device 105b is being used by a participant of the online presentation to receive and consume the online presentation content. The client device 105a may include a native application 250a, a browser application 255a, a stream processing unit 260a, and a content capture unit 265a. Similarly, the client device 105b may include a native application 250b, a browser application 255b, a stream processing unit 260b, and a content capture unit 265b. Client devices 105c and 105d have been omitted from FIG. 2 as a matter of clarity. Each of the client devices may include the same elements or may include a different combination of elements. The client devices 105 of the presenter and the participants need not be identical.

The client device 105b of the participant may be configured to capture audio and/or video streams of the participant while the presentation is underway. The presentation and communications platform 110 may receive and analyze these streams using machine learning models to identify user actions and to map the actions to reaction icons or emoticons that may automatically be shown to the presenter during the online presentation.

The native applications 250a and 250b may represent an application developed for use on the client device 105. The native applications 250a and 250b may be a presentation application that may communicate with the presentation and communications platform 110 to provide a user interface for creating, modifying, participating in, and/or conducting online presentations. The native applications 250a and 250b may also be communications platform applications, such as but not limited to Microsoft Teams, which may permit a presenter to share an online presentation with participants as part of an online communications session. The native application 250a and 250b may be the same application or a different application in some implementations. For example, the presenter may present an online presentation using a first native application 250a while a participant may view and/or participate in the online presentation using a second native application 250b. In some implementations, the gesture detection unit 215 may be stored locally on the client devices 250a or 250b as part of the natively applications 250a and/or 250b.

The browser applications 255a and 255b may represent an application for accessing and viewing web-based content. The browser applications 255a and 255b may be the same application or may be different applications. In some implementations, the presentation and communications platform 110 may provide a web service for conducting and/or participating in an online presentation and/or communication session. The presenter or the participants may access the web application and render a user interface for interacting with the presentation and communications platform 110 in the browser applications 255a and 255b. In some implementations, the presentation and communications platform 110 may support both the native application 250a and 250b and the web application, and the presenter and participants may choose whichever approach best suites them for conducting and/or participating in an online presentation and/or communications session.

The client devices 150a and 150b may also include a stream processing unit 260a and 260b, which may be configured to generate one or more media streams to be transmitted to the presentation and communications platform 110. The content capture units 265a and 265b may be configured to capture audio and/or video content using the microphone and/or camera of the client device 105a and 105b, respectively. The content capture units 265a and 265b may be configured to interface with these hardware elements to capture the audio and/or video content that may be provided to the stream processing units 260a and 265b of the respective client devices 105a and 105b. The stream processing units 260a and 265b may be configured to process the audio and/or content obtained by the content capture units 265a and 265b, respectively, into one or more media streams that may be transmitted to the presentation and communications platform 110.

While the example implementation shown in FIG. 2 discusses the use of the techniques disclosed herein with an online presentation, the techniques for automatically generating reaction information for a presenter may be extended to any online communications sessions or online meeting where one participant may at least temporarily assume the role of a presenter by speaking to the other participants of the online communications session about some topic. The presentation and communications platform 110 may analyze the audio and/or video streams captured by the client devices 105 of the other participants and automatically generate reactions as discussed above. The reactions may be presented to just the participant that is currently acting as a presenter or to all the participants of the online communications session.

Figure 3:
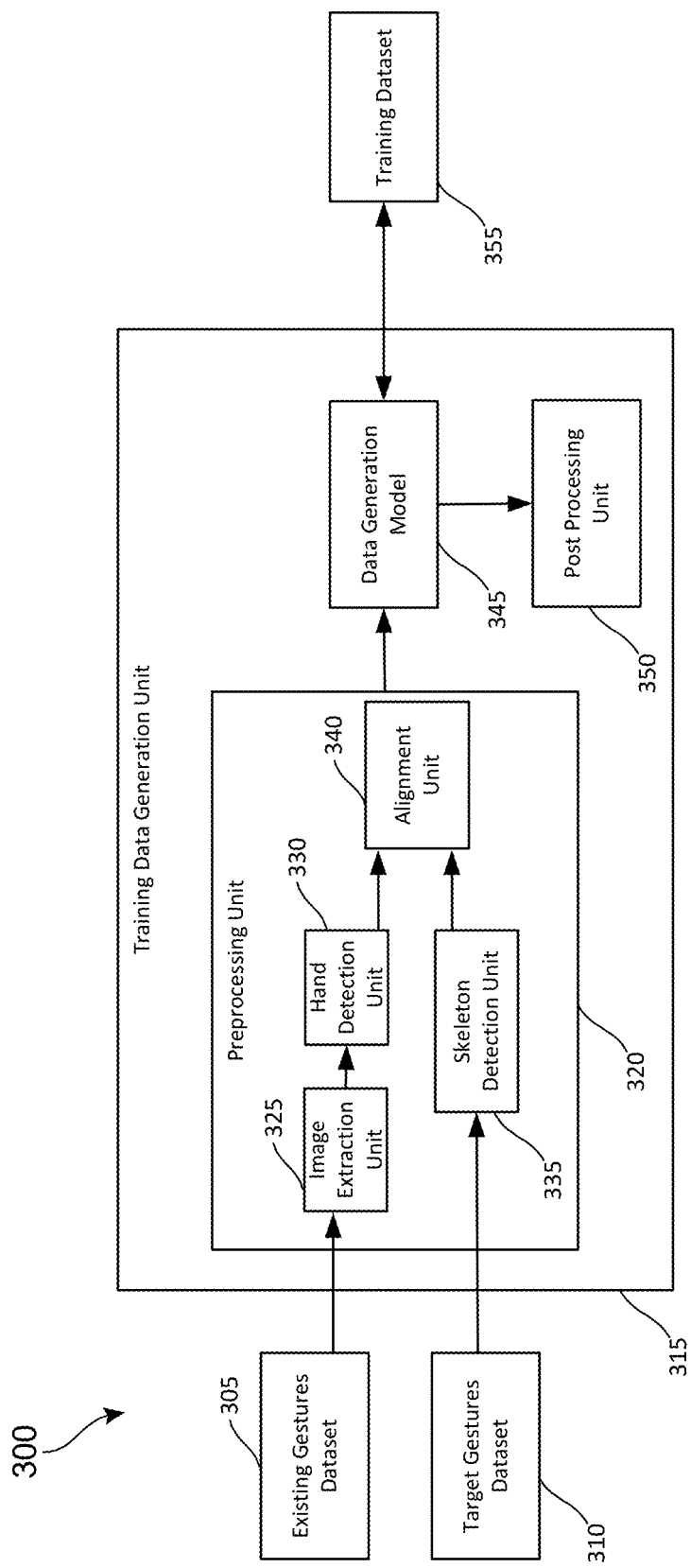
FIG. 3 depicts a system level data flow between some elements of a training data generation system.

FIG. 3 depicts a system level data flow between some elements of a training data generation system 300. As discussed above, to property train gesture detection models, training data relating to various distinct types of gestures may be needed. However, in practice, obtaining image and/or video data that displays distinct types of gestures and labeling such data to enable its use in training a neural model is time consuming and expensive. Yet, many labeled images and/or videos may be available for certain types of gestures. For example, because thumbs up is a gesture that is commonly used, a large number of image and/or video files displaying various people making the thumbs up gesture may be available for training gesture detection models. Furthermore, these images and video files may already be labeled and/or categorized as relating to the thumbs up type of gesture. Gestures for which training data is available may be referred to herein as existing gestures or original gestures, while gestures for which training data is not readily available but is needed may be referred to as target gestures. To address the problem of lack adequate training data for target gestures, training data for existing gestures may be utilized to generate training data for the target gestures.

This may be achieved by providing data from an existing gesture dataset 305 as well as data from a target gestures dataset 310 to a training data generation unit 315. The existing gestures dataset 305 may include image and/or video data for one or more existing gestures. For example, the existing gestures dataset 305 may include a plurality of video files for each of the single finger raise, hand raise and thumps up gestures. These video files may display multiple people performing each of the existing single finger raise, hand raise and thumps up gestures. The video files may be labeled by the existing gesture they display and may be stored in the existing gesture dataset 305 for use in generating synthetic training data for the target gestures.

When a need for generating training data for a target gesture arises, an image and/or video file relating to an existing gesture may be retrieved from the existing gestures dataset 305 and transmitted to the preprocessing unit 320. The image and/or video retrieved from the existing gestures dataset 305 may display an existing gesture that has been identified as being helpful in generating a target gesture. This determination may be made automatically, for example by using an ML model or it may be made manually. For example, a developer or engineer may determine that the single finger raise gesture is closely associated with the peace signal gesture and as such would be a good option for use in generating training data for the peace signal gesture. As another example, the thumbs up gesture may be identified as being an appropriate gesture to use for generating the target thumbs down gesture.

The image and/or video file for the identified existing gesture may be transmitted to an image extraction unit 325 of the preprocessing unit 320. That is because many of the training data files for existing gestures are video files that include multiple frames. In order to properly generate the required target gesture data, the video file may first need to be preprocessed into its image frames. The image extraction unit 325 may process the received video files into one or more image frames. Each of the image frames may then be transmitted to the hand detection unit 330 for further processing.

The hand detection unit 330 may be used for hand gestures and may include an algorithm for detecting the location of the hand in the image. This may be achieved by using one or more ML models that detect a hand in an image and/or video stream. In an example, the algorithm for detecting the location of the hand is MediaPipe Hands, which is a mechanism for hand and finger tracking in image frames. In an example, the hand is detected by using the following hand detect formula.

$$bb_I = [x_I^0, y_I^0, x_I^1, y_I^1] \qquad (2)$$

I in formula 2 represents an original image and $bb_I$ represents a bounding box for the original image I. $x_I^0$ and $y_I^0$ represent the upper left corner coordinates for the bounding box being drawn around the hand, while $x_I^1$ and $y_I^1$ may represent the coordinates for the lower right side of the bounding box or width and height of the bounding box. In some implementations, the hand detection mechanism generates key points for the hand and the x and y coordinates are then calculated based on the generated key points.

Once the location of the hand is detected, the hand detection unit 330 may utilize a bounding box around the detected hand in the image frame. For gestures that do not involve the use of a hand (e.g., nodding head), a similar detection unit may be utilized for detecting the location of the body part (e.g., head) used for making the gesture. The location may then be identified in the image by using a bounding box.

To generate image and/or video files that display the target gestures, an image and/or video file associated with the target gesture may also be needed. In some implementations, this is managed by making use of skeleton images that display the target gesture with line drawings or representative skeletons of the body part needed for making the gesture. For example, when the target gesture is the peace sign, an image showing a hand skeleton that displays the peace sign may be used. The skeleton target images may be computer-generated, or they may be retrieved or purchased from sources that offer skeleton images for procurement. Because the target gesture data used is a simple skeleton image as opposed to videos of multiple individuals performing the target gesture, obtaining and/or generating the skeleton image may be simpler and/or less expensive than acquiring training datasets containing various individuals performing a gesture. The generated and/or retrieved skeleton images may be categorized (e.g., labeled) based on the target gesture they display and may be stored in a target gesture dataset 310.

When a need for generating training data for a target gesture arises, in addition to transmitting video files of an existing gesture, the skeleton image of the target gesture may also be transmitted to the preprocessing unit 320. The skeleton image may be sent to a skeleton detection unit 335 for processing. The skeleton detection unit 335 may include one or more algorithms for detecting the location of the skeleton in the image. For example, if the image contains large areas of blank space and the skeleton is located in a corner of the image, the skeleton detection unit 335 may detect the skeleton in the image and mark the location of the skeleton by using a bounding box. To detect the skeleton, the skeleton detection unit 335 may utilize one or more ML models or other mechanisms for detecting specific image objects. In some implementations, the hand detection unit 330 used for detecting the hand in the existing gesture images can also be used to detect the skeleton in the skeleton images. In another implementation, the skeleton is detected by detecting the top left and bottom right corner of a pixel having a specific value (e.g., a pixel with the value (255, 255, 255)). In an example, the skeleton is detected by using the following skeleton detection formula.

$$bbk = [x_k^0, y_k^0, x_k^1, y_k^1] \quad (3)$$

K in formula 3 represents a skeleton image and bbk represents a bounding box for the skeleton.

Once the location of both the hand and the skeleton have been identified in their respective images, those images are transmitted to the alignment unit 340. The alignment unit 340 may be used to align the location of the hand in the existing gesture image with the location of the skeleton in the skeleton image. This may require padding the existing gesture image such that the location of the hand in the existing gesture image is moved to a location that is aligned with the location of the skeleton as identified by the skeleton detection unit 335. In some implementations, this is achieved by utilizing an alignment algorithm. An example alignment algorithm is displayed below for which the input is an input gesture image I containing an original hand gesture gin and a skeleton image K containing a target skeleton gesture s. The output of the algorithm is an aligned input gesture image and skeleton image pair [I'; K].

Input: Image-skeleton pair [I; K].
Output: Aligned image-skeleton pair [I'; K].
Image-skeleton alignment
    Size of I=[$W_I$, $H_I$]
    Size of K=[$W_K$, $H_K$]

$$\text{Position of } g_{in} = [x_I^{pos}, y_I^{pos}] \leftarrow \left[(x_I^0 + x_I^1) \times \frac{W_I}{2}, (y_I^0 + y_I^1) \times H_I/2\right]$$

$$\text{Position of } s = [x_K^{pos}, y_K^{pos}] \leftarrow \left[(x_K^0 + x_K^1) \times \frac{W_K}{2}, (y_K^0 + y_K^1) \times H_K/2\right]$$

Width offset $\Delta w = x_I^{pos} - x_K^{pos}$
    Height offset $\Delta h = y_I^{pos} - xy_K^{pos}$
    Process I for alignment:
    if $\Delta w > 0$ then
        I'←Pad I with $\Delta w$ on the right-hand side
        I'=I'[:, $\Delta w$:]
    else
        I'←Pad I with $\Delta w$ on the left-hand side
        I'=I'[:,: $\Delta w$:]
    end
    if $\Delta h > 0$ then
        I'←Pad I' with $\Delta h$ on the bottom
        I'=I'[$\Delta h$:, :]
    else
        I'-Pad I' with $\Delta h$ on the top
        I'=I'[: $\Delta h$, :]
    end
end
While the above example algorithm aligns the existing gesture image, a similar algorithm may be used to align the skeleton image.

Once the existing gesture image and the skeleton image have been aligned by the alignment unit 340, the resulting images may be transmitted to the data generation model 345 to generate the combined image. The data generation model 345 may utilize a controllable image to image translation method which takes a pair of images as inputs and generates a target image by translating a target gesture in the skeleton image onto the aligned existing gesture image. As such, the data generation model 345 may include one or more image-based ML models for generating image frames. In some implementations, the model used is a generative model such as a GAN model. In an example, the data generation model 345 includes a GestureGAN model which is a key point/skeleton guided image to image translation model for generating images with target gestures.

Targeted generation may require motion information. For example, motion detection may be needed to distinguish between a hand raise gesture and a hand waving gesture. In such cases, preserving and generating movements between two frames may be needed to enhance the model. In addition, since hand gestures may not be recognized in all consecutive frames, synthetic frame interpolation mechanisms may be used to correct the frames for which the hand gesture is not detected.

Once the data generation model 345 combines the input images to generate a target gesture image, the generated target gesture image may be provided as an output of the data generation model 345 to a post processing unit 350. The post processing unit 350 may operate to crop the generated image to remove any paddings added during preprocessing.

Moreover, the post processing unit 350 may resize the image to a size appropriate for training the gesture detection model. Still further, the post processing unit 350 may label the generated image with the target gesture such that the image is prepared for use in training. In some implementations, one or more generated image frames that correspond to extracted image frames of an input video file are combined by the post processing unit 350 to generate a target video file for use in training the gesture detection model. As such, once the post processing unit 350 completes the post processing operations, the generated image and/or video files may be transmitted to the training dataset 355 for use in training gesture detection models.

Figure 4:
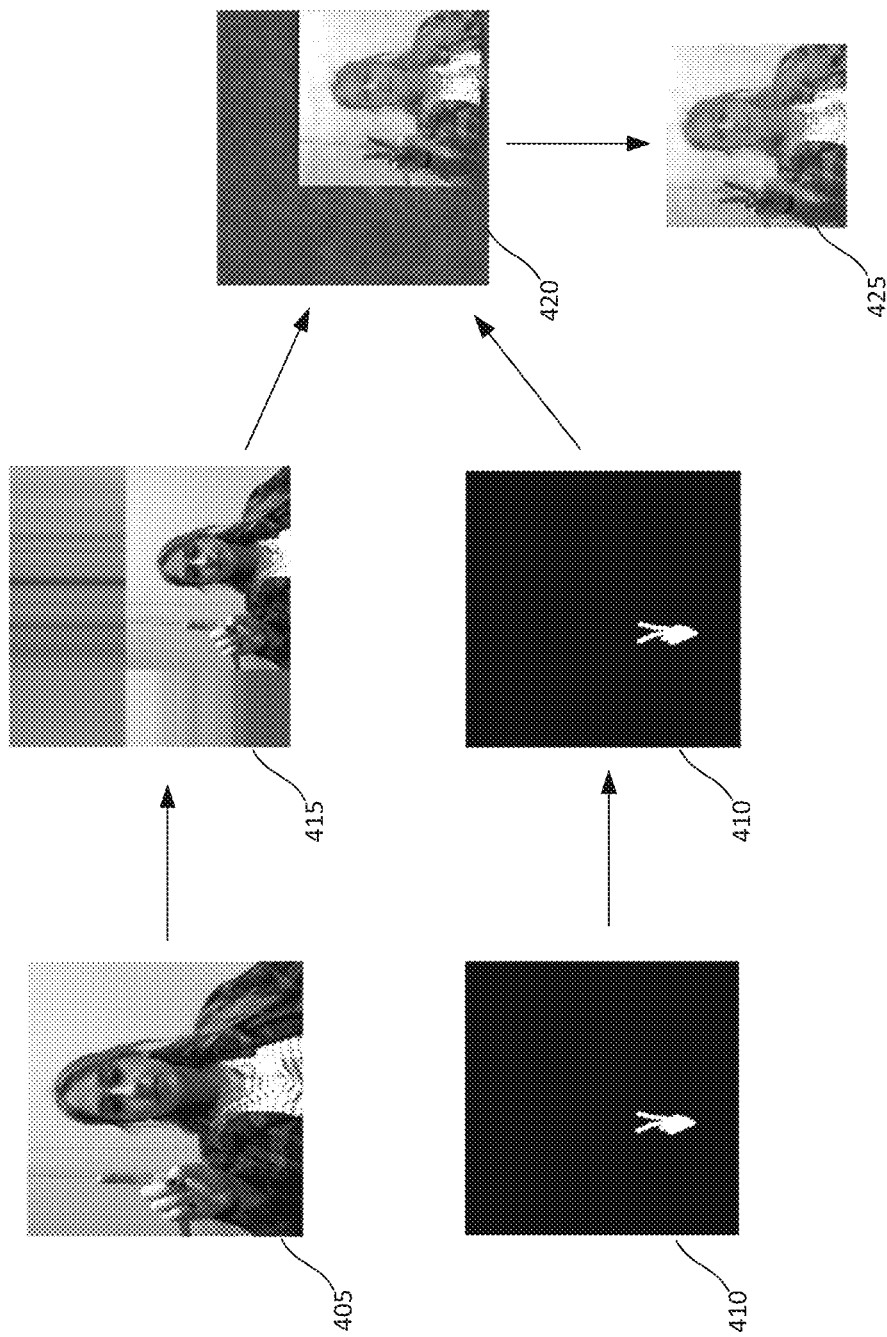
FIG. 4 depicts example processing of existing gesture image and skeleton image to generate an example target gesture image.

FIG. 4 depicts processing of an example existing gesture image and skeleton image to generate an example target gesture image. The existing gesture for the image processing depicted in FIG. 4 is a single finger raise gesture and the target gesture is a peace sign. The existing gesture is illustrated by the existing gesture image 405. The existing gesture image 405 may depict an image frame that has been extracted from a finger raise video file. In order to generate the target gesture image, a skeleton image for the peace sign, such as the skeleton image 410, may be used.

To ensure the existing gesture image 405 can be combined with the skeleton image 410 to generate the desired target image, the existing gesture image 405 may be preprocessed to generate the processed image 415. The processed image 415 includes padding and alignment such that the location of the hand in the processed image 415 is aligned with the location of the hand in the skeleton image 410. As described with respect to FIG. 3, this may require the use of a hand detection unit and a skeleton detection unit to detect the locations of the hand and the skeleton and the use of an alignment unit to align the location of the hand with the location of the skeleton.

The processed image 415 and the skeleton image 410 may then be provided as inputs to a data generation model to generate the combined image 420. The combined image 420 may display the person and visual features depicted in the existing gesture image 405. However, instead of displaying the original gesture of a single finger raise, the person in the combined image 420 is depicted as making the target gesture of a peace sign. Thus, an existing image displaying one type of gesture may be used to generate an image of the same person displaying another type of gesture.

Once the combined image 420 is generated, it may be postprocessed to create the target image 425. As depicted, postprocessing may include cropping the combined image to remove the additional padding added during the preprocessing phase and/or resizing the combined image to achieve a desired image size. The resulting target image 425 may then be used in training a gesture detection model to detect the peace sign gesture.

Figure 5:
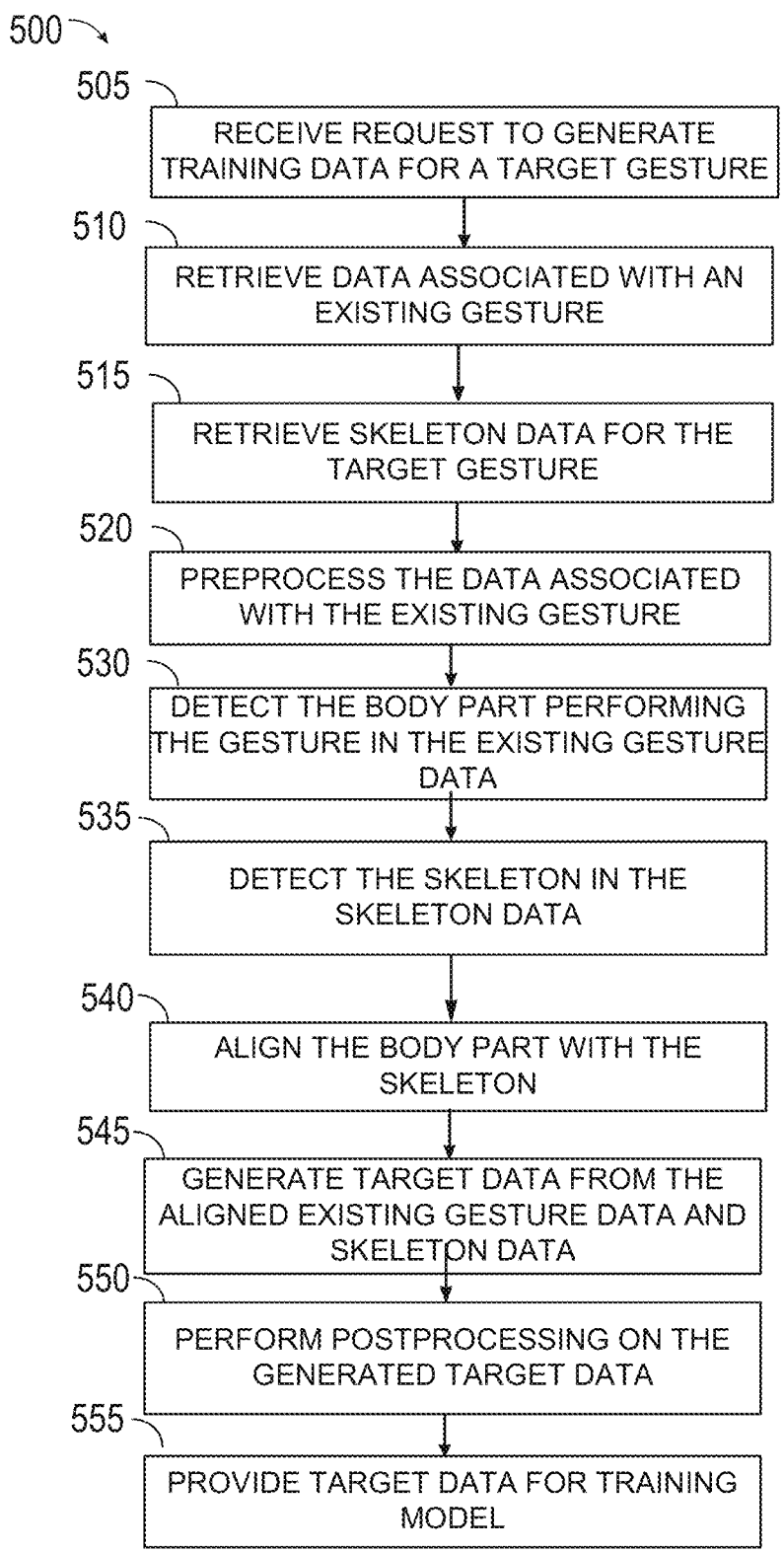
FIG. 5 is a flow diagram depicting an example method for generating training data for training a gesture detection model.

FIG. 5 is a flow diagram depicting an exemplary method 500 for generating training data for training a gesture detection model. One of more steps of the method 500 may be performed by a training data generation unit such as the training data generation unit of FIG. 3. At 505, method 500 may begin by receiving a request to generate training data for a given target gesture. The request may be received from a user utilizing the system to generate training data for a particular type of target gesture. For example, if the user determines that the training data for a gesture detection model does not include sufficient data relating to the peace gesture or the thumbs down gesture, the user may submit a request for generating training data for the peace or the thumbs down gesture. Alternatively, the request may be generated or submitted automatically as part of a process of analyzing training data for a gesture detection model or the target training data generation process may be invoked automatically.

Once the request for generating training data is received, method 500 may proceed to retrieve data associated with a type of gestures for which existing training data is available, at 510. Before the existing gesture data is retrieved, the existing type of gesture may be identified by a user and/or automatically as a type of gesture that can be used to generate the target gesture data. For example, the single finger raise gesture may be identified as being useful for generating the peace sign. Data associated with the existing gesture may include image and/or video files displaying the identified existing gesture. The existing gesture data may be retrieved from a data store that stores training data for training the gesture detection model.

In addition to retrieving the existing gesture data, method 500 may also retrieve skeleton data for the target gesture, at 515. The skeleton data may be retrieved from a data store that stores skeleton data for target gestures. The skeleton data may be computer-generated and/or may be retrieved from a variety of other sources. The skeleton data may be an image displaying a skeleton of the target gesture. For example, when the target gesture is the peace sign, the skeleton data may be an image of a hand skeleton depicting the peace sign.

In some implementations, method 500 may preprocess the existing gesture data, at 520. Preprocessing the existing gesture data may include extracting individual frames that make a up a video file of the existing gesture. For example, if the existing gesture data includes a video file a person raising a single finger, the preprocessing may include extracting multiple image frames from the video and transmitting each of the image frames for generating a corresponding target image. After preprocessing the existing gesture data, method 500 may proceed to detect the body part performing the gesture in the existing gesture data, at 530. This may be achieved by utilizing a hand detecting unit or a similar algorithm for identifying a head or another body part if those are the body parts used for making the existing gesture (e.g., nodding head). Detecting the body part may involve utilizing an ML model for detecting the location of the body part within the existing gesture image.

After the body part in the existing gesture data has been located, method 500 may proceed to detect the location of the skeleton in the skeleton data, at 535. This may involve use of a skeleton detection unit, as discussed in detail with respect to FIG. 3. Once the locations of both the body part and the skeleton have been identified, method 500 may proceed to align the location of the body part with the skeleton, at 540. This may involve modifying one of the images to make the alignment.

After one of the images has been modified to align the location of the body part with the skeleton, method 500 may proceed to generate the target image from the aligned existing gesture data and the skeleton data, at 545. This may involve providing the aligned existing gesture data and the skeleton data to an ML model and receiving the generated target image as the output of the ML model. The ML model may include image translation to combine the two images into the target image. The target image may preserve the visual features of the existing gesture image but display the target gesture.

Once the target data has been generated, method 500 may proceed to perform postprocessing steps on the generated target data, at 550, to prepare the target data for use in model training. The postprocessing operations may include removing padding or reversing other modifications made during the preprocessing steps. For example, if the existing gesture data was modified to add padding to the image, the additional padding may be removed. Furthermore, the target data may be resized to achieve a desired image size for the target data. After postprocessing has been completed, the target data may be provided for training a gesture detection model, at 555.

Figure 6:
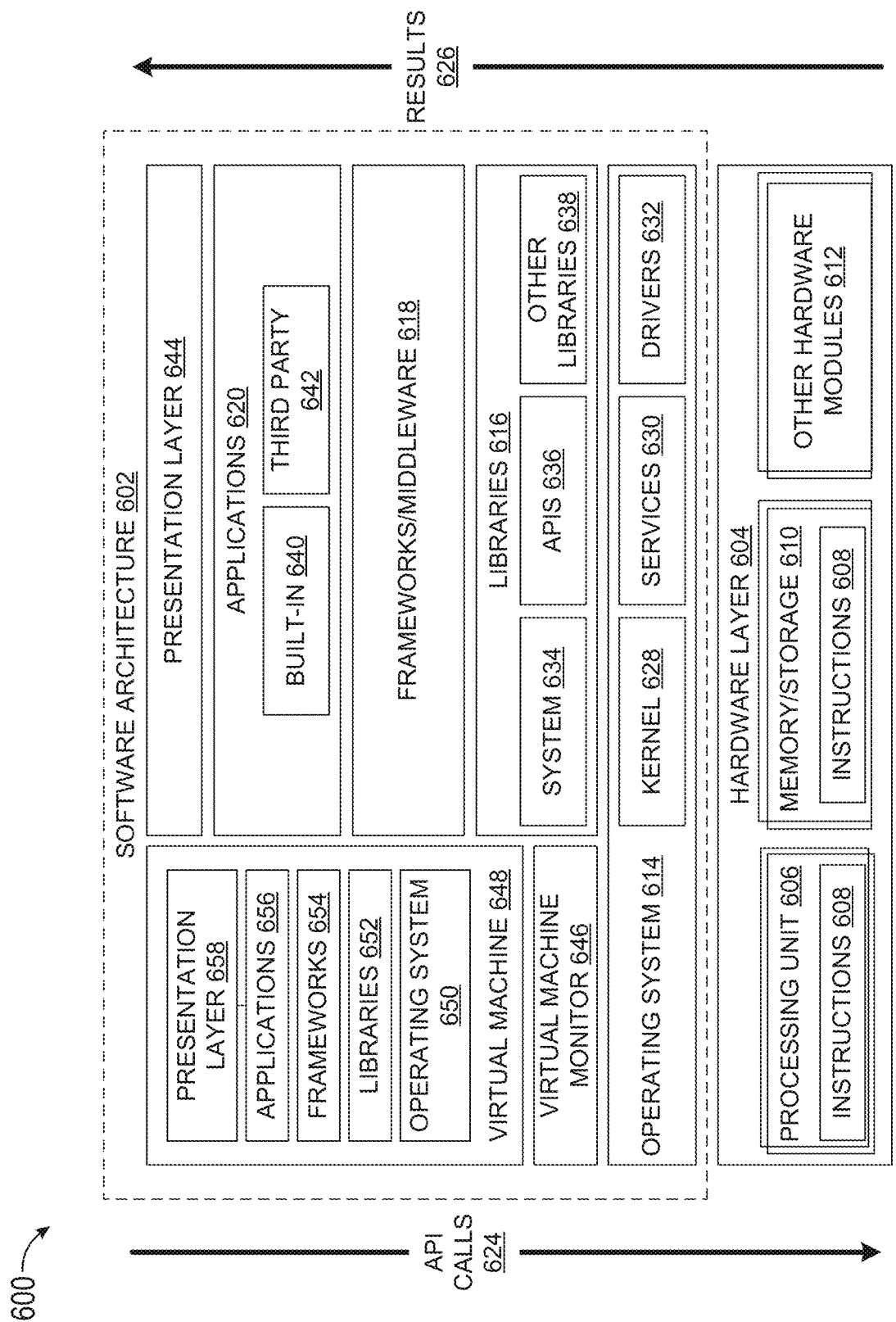
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 646 which manages operation of the virtual machine 628 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
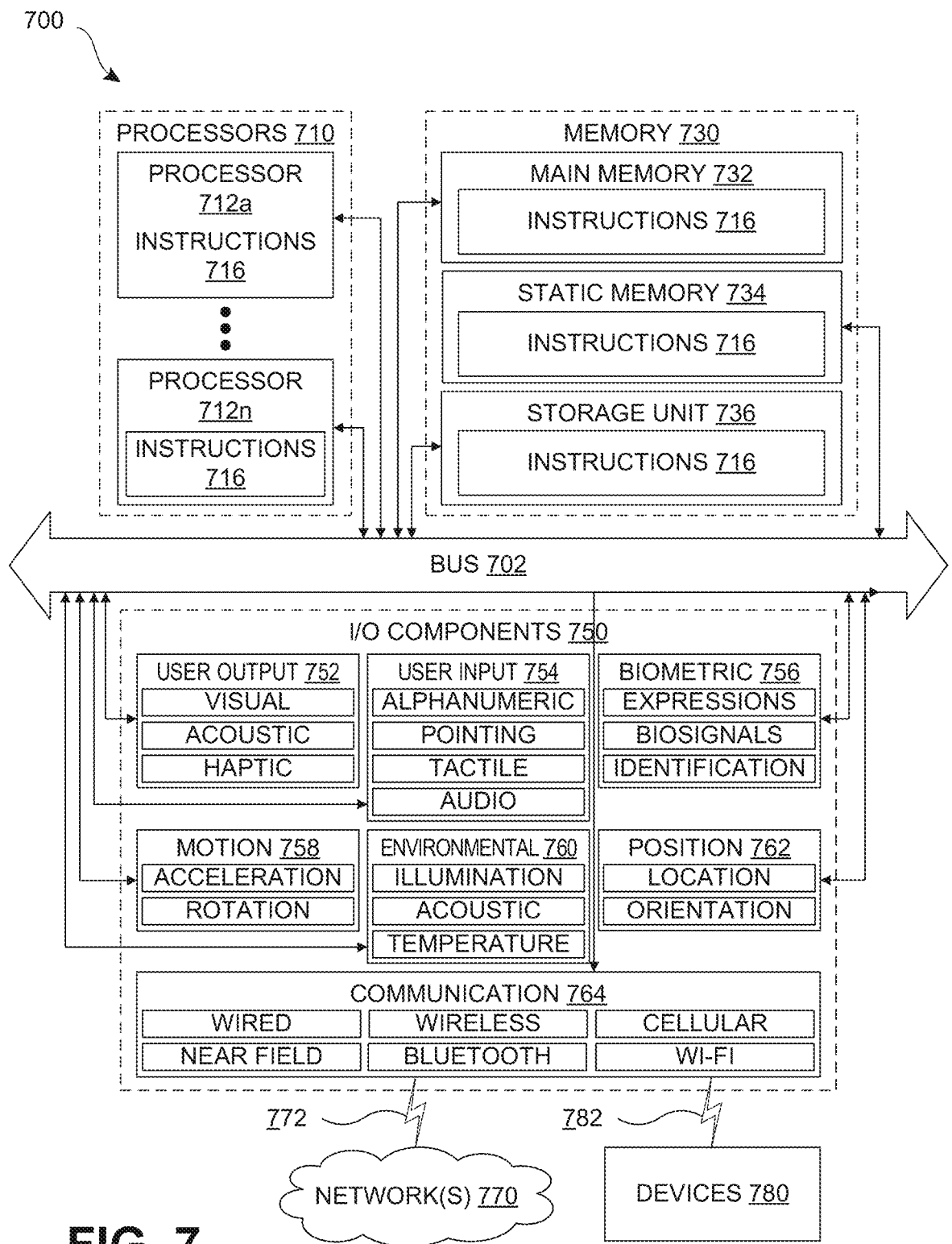
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by, the processor, cause the data processing system to perform functions of:
    receiving a request to generate training data for a gesture detection machine-learning (ML) model, the training data being associated with a target gesture;
    retrieving data associated with an original gesture, the original gesture being a gesture that is made using a body part;
    retrieving skeleton data associated with the target gesture, the skeleton data displaying a skeleton representative of the body part and the skeleton displaying the target gesture;
    aligning a first location of the body part in the data with a second location of the skeleton in the skeleton data;
    providing the aligned data and the skeleton data as input to an ML model for generating a target data that displays the target gesture;
    receiving the target data as an output from the ML model, the target data preserving a visual feature of the data and displaying the target gesture; and
    providing the target data to the gesture detection ML model for training the gesture detection ML model in detecting the target gesture.

Item 2. The data processing system of item 1, wherein the instructions further cause the processor to cause the data processing system to perform functions of detecting the first location by detecting the body part in the data.

Item 3. The data processing system of items 1 or 2, wherein the instructions further cause the processor to cause the data processing system to perform functions of detecting the location of the skeleton by detecting the skeleton in the skeleton data.

Item 4. The data processing system of any preceding item, wherein the data includes a video stream displaying the target gesture.

Item 5. The data processing system of item 4, wherein the instructions further cause the processor to cause the data processing system to perform functions of:
  extracting one or more image frames from the video stream;
  aligning the first location of the body part in one of the one or more image frames with a second location of the skeleton in the skeleton data; and
  providing the aligned one of the one or more image frames as an input to the ML model for generating a target data that displays the target gesture.

Item 6. The data processing system of any preceding item, wherein the ML model is a generative adversarial network (GAN) model.

Item 7. The data processing system of any preceding item, wherein the instructions further cause the processor to cause the data processing system to perform functions of processing the target data to perform at least one of removing padding added during processing the data or resizing the target data to a desired size.

Item 8. The data processing system of any preceding item, wherein the gesture detection ML model is used in detecting one or more gestures during an online presentation.

Item 9. A method for generating training data for training a gesture detection machine-learning (ML) model, comprising:
  receiving a request to generate training data for the gesture detection ML model, the training data being associated with a target gesture;

retrieving data associated with an original gesture, the original gesture being a gesture that is made using a body part;

retrieving skeleton data associated with the target gesture, the skeleton data displaying a skeleton representative of the body part and the skeleton displaying the target gesture;

aligning a first location of the body part in the data with a second location of the skeleton in the skeleton data;

providing the aligned data and the skeleton data as input to an ML model for generating a target data that displays the target gesture;

receiving the target data as an output from the ML model, the target data preserving a visual feature of the data and displaying the target gesture; and providing the target data to the gesture detection ML model for training the gesture detection ML model in detecting the target gesture.

Item 10. The method of item 9, further detecting the first location by detecting the body part in the data.

Item 11. The method of items 9 or 10, further comprising detecting the location of the skeleton by detecting the skeleton in the skeleton data.

Item 12. The method of any of items 9-11, wherein the data includes a video stream displaying the target gesture.

Item 13. The method of item 12, further comprising:
extracting one or more image frames from the video stream;
aligning the first location of the body part in one of the one or more image frames with a second location of the skeleton in the skeleton data; and
providing the aligned one of the one or more image frames as an input to the ML model for generating a target data that displays the target gesture.

Item 14. The method of any of items 9-13, wherein the ML model is a generative adversarial network (GAN) model.

Item 15. A non-transitory computer readable medium on which are stored instructions that, when executed, cause a programmable device to perform functions of:
receiving a request to generate training data for a gesture detection machine-learning (ML) model, the training data being associated with a target gesture;
retrieving data associated with an original gesture, the original gesture being a gesture that is made using a body part;
retrieving skeleton data associated with the target gesture, the skeleton data displaying a skeleton representative of the body part and the skeleton displaying the target gesture;
aligning a first location of the body part in the data with a second location of the skeleton in the skeleton data;
providing the aligned data and the skeleton data as input to an ML model for generating a target data that displays the target gesture;
receiving the target data as an output from the ML model, the target data preserving a visual feature of the data and displaying the target gesture; and
providing the target data to the gesture detection ML model for training the gesture detection ML model in detecting the target gesture.

Item 16. The non-transitory computer readable medium of item 15, wherein the instructions further cause the programmable device to perform functions of detecting the first location by detecting the body part in the data.

Item 17. The non-transitory computer readable medium of any of items 15-16, wherein the instructions further cause the programmable device to perform functions of detecting the location of the skeleton by detecting the skeleton in the skeleton data.

Item 18. The non-transitory computer readable medium of any of items 15-17, wherein the data includes a video stream displaying the target gesture.

Item 19. The non-transitory computer readable medium of item 18, wherein the instructions further cause the programmable device to perform functions of:
extracting one or more image frames from the video stream;
aligning the first location of the body part in one of the one or more image frames with a second location of the skeleton in the skeleton data; and
providing the aligned one of the one or more image frames as an input to the ML model for generating the target data that displays the target gesture.

Item 20. The non-transitory computer readable medium of item 15, wherein the ML model is a generative adversarial network (GAN) model.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by, the processor, cause the data processing system to perform functions of:
   receiving a request to generate training data for a gesture detection machine-learning (ML) model, the training data being associated with a target gesture;
   retrieving data associated with an original gesture, the original gesture being a gesture that is made using a body part;
   retrieving skeleton data associated with the target gesture, the skeleton data displaying a skeleton representative of the body part and the skeleton displaying the target gesture;
   aligning a first location of the body part in the data with a second location of the skeleton in the skeleton data;
   providing the aligned data and the skeleton data as input to an ML model for generating a target data that displays the target gesture;
   receiving the target data as an output from the ML model, the target data preserving a visual feature of the data and displaying the target gesture; and
   providing the target data to the gesture detection ML model for training the gesture detection ML model in detecting the target gesture.

2. The data processing system of claim 1, wherein the instructions further cause the processor to cause the data processing system to perform functions of detecting the first location by detecting the body part in the data.

3. The data processing system of claim 1, wherein the instructions further cause the processor to cause the data processing system to perform functions of detecting the location of the skeleton by detecting the skeleton in the skeleton data.

4. The data processing system of claim 1, wherein the data includes a video stream displaying the target gesture.

5. The data processing system of claim 4, wherein the instructions further cause the processor to cause the data processing system to perform functions of:
   extracting one or more image frames from the video stream;
   aligning the first location of the body part in one of the one or more image frames with a second location of the skeleton in the skeleton data; and
   providing the aligned one of the one or more image frames as an input to the ML model for generating the target data that displays the target gesture.

6. The data processing system of claim 1, wherein the ML model is a generative adversarial network (GAN) model.

7. The data processing system of claim 1, wherein the instructions further cause the processor to cause the data processing system to perform functions of processing the target data to perform at least one of removing padding added during processing the data or resizing the target data to a desired size.

8. The data processing system of claim 1, wherein the gesture detection ML model is used in detecting one or more gestures during an online presentation.

9. A method for generating training data for training a gesture detection machine-learning (ML) model, comprising:
   receiving a request to generate training data for the gesture detection ML model, the training data being associated with a target gesture;
   retrieving data associated with an original gesture, the original gesture being a gesture that is made using a body part;
   retrieving skeleton data associated with the target gesture, the skeleton data displaying a skeleton representative of the body part and the skeleton displaying the target gesture;
   aligning a first location of the body part in the data with a second location of the skeleton in the skeleton data;
   providing the aligned data and the skeleton data as input to an ML model for generating a target data that displays the target gesture;
   receiving the target data as an output from the ML model, the target data preserving a visual feature of the data and displaying the target gesture; and
   providing the target data to the gesture detection ML model for training the gesture detection ML model in detecting the target gesture.

10. The method of claim 9, further detecting the first location by detecting the body part in the data.

11. The method of claim 9, further comprising detecting the location of the skeleton by detecting the skeleton in the skeleton data.

12. The method of claim 9, wherein the data includes a video stream displaying the target gesture.

13. The method of claim 12, further comprising:
   extracting one or more image frames from the video stream;
   aligning the first location of the body part in one of the one or more image frames with a second location of the skeleton in the skeleton data; and
   providing the aligned one of the one or more image frames as an input to the ML model for generating the target data that displays the target gesture.

14. The method of claim 9, wherein the ML model is a generative adversarial network (GAN) model.

15. A non-transitory computer readable medium on which are stored instructions that, when executed, cause a programmable device to perform functions of:
   receiving a request to generate training data for a gesture detection machine-learning (ML) model, the training data being associated with a target gesture;

retrieving data associated with an original gesture, the original gesture being a gesture that is made using a body part;
retrieving skeleton data associated with the target gesture, the skeleton data displaying a skeleton representative of the body part and the skeleton displaying the target gesture;
aligning a first location of the body part in the data with a second location of the skeleton in the skeleton data;
providing the aligned data and the skeleton data as input to an ML model for generating a target data that displays the target gesture;
receiving the target data as an output from the ML model, the target data preserving a visual feature of the data and displaying the target gesture; and
providing the target data to the gesture detection ML model for training the gesture detection ML model in detecting the target gesture.

16. The non-transitory computer readable medium of claim 15, wherein the instructions further cause the programmable device to perform functions of detecting the first location by detecting the body part in the data.

17. The non-transitory computer readable medium of claim 15, wherein the instructions further cause the programmable device to perform functions of detecting the location of the skeleton by detecting the skeleton in the skeleton data.

18. The non-transitory computer readable medium of claim 15, wherein the data includes a video stream displaying the target gesture.

19. The non-transitory computer readable medium of claim 18, wherein the instructions further cause the programmable device to perform functions of:
  extracting one or more image frames from the video stream;
  aligning the first location of the body part in one of the one or more image frames with a second location of the skeleton in the skeleton data; and
  providing the aligned one of the one or more image frames as an input to the ML model for generating the target data that displays the target gesture.

20. The non-transitory computer readable medium of claim 15, wherein the ML model is a generative adversarial network (GAN) model.

* * * * *